UNITED STATES PATENT OFFICE.

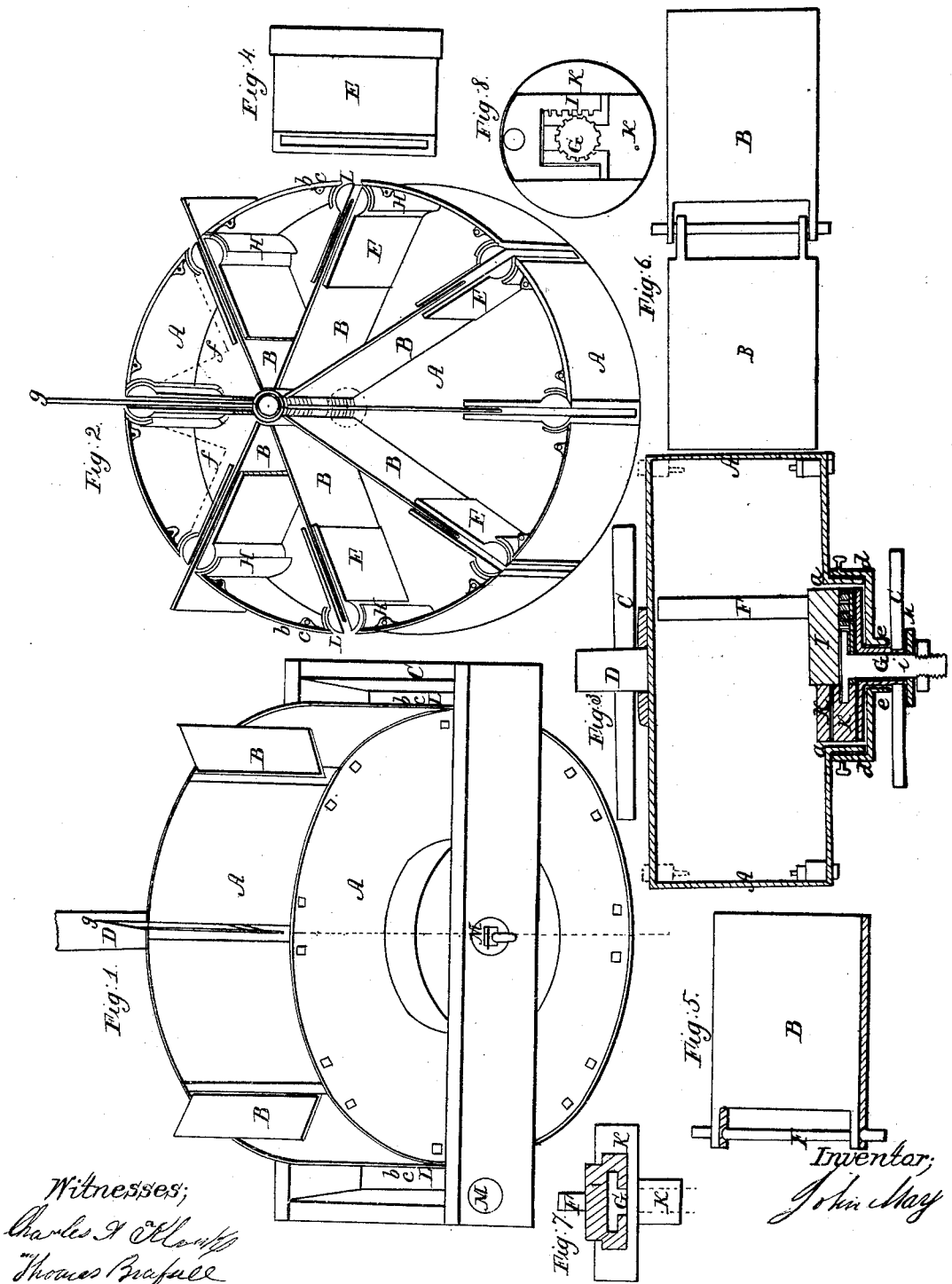

JOHN MAY, OF COLUMBUS, GEORGIA.

IMPROVEMENT IN PADDLE-WHEEL PROPELLERS.

Specification forming part of Letters Patent No. 21,432, dated September 7, 1858.

*To all whom it may concern:*

Be it known that I, JOHN MAY, of Columbus, in the county of Muscogee and State of Georgia, have invented a new and useful improvement in propellers or paddle-wheels for the purpose of propelling boats, vessels, steamers, or balloons, or any other device that may be propelled by said propeller or paddle-wheel; and I do hereby declare that the following is a full, clear, and exact description of the construction and operation of the same, reference being had to the annexed drawings, making a part of this specification, in which—

Figure 1 is a perspective view. Fig. 2 is a transverse section. Fig. 3 is a longitudinal section. Fig. 4 is a perspective view of guides for the buckets. Figs. 5 and 6 are views of the buckets; Figs. 7 and 8, views of the adjustable center, slides, and disks.

A A is the hollow drum or cylinder.

B B are the buckets.

E E are the guides for the buckets.

F F is the adjustable center.

I I is the slide in which the center F is made fast or stationary.

K K is the circular disk or plate with grooves for the purpose of making the slide I to fit therein.

G G is the wheel and shaft to adjust the center F.

H H are the shoulders or arches for holding the guides in their respective apertures.

M M are wheels or drums for the purpose of adjusting the center F.

C C is the frame-work, for the purpose of or in which the plate or disk K is connected and made firm therein, for the plate K, slide J, and the center F are held in their places by this frame.

D D is the main shaft, which is made fast to the hollow drum or cylinder A.

L L are apertures or openings in the circumference of the drum A, through which the buckets pass and repass.

*a a* is the recess, made in the abutment or head of the cylinder, in order to make the adjustable center with its fixtures strong and substantial—that is, of any required strength.

I construct the hollow cylinder in two parts, or more, if necessary, making as many apertures in the rim or circumference thereof as are required buckets.

B are the shoulders or arches.

H H are cast on the sections of the rim, or are made firm and fast thereto, so that the guides E E may be held by their heads firmly therein, so that they cannot be drawn or shoved out of their respective apertures. These arches may be bored or worked out with respective apertures, so as to fit neatly and snugly the heads of the guides, making them water or air tight. The head of the drum or cylinder A A, opposite to the main shaft D, is cast or made with a recess in the inner side, as at *a a*, Fig. 3, which is closed by a hollow plate or disk with a rim thereto, as seen at *d d*, Fig. 3, or this plate or disk may be made or cast solid with the head of the drum or cylinder A A, leaving a circular opening in the center thereof for the neck or shaft of K K to pass through, as at *e e*, Fig. 3. The guides E E are cast with an opening through them of the width and thickness of the buckets B B, so as to fit them closely. These guides are made a little longer than the length of the buckets—that is, that part of the buckets which project from the circumference of the drum of the wheel whenever the said buckets are equal in length to the semi-diameter of the drum or cylinder A A, but otherwise they may be made shorter. The heads of these guides are made round, as seen at Fig. 2, in order that they may work on a pivot in the apertures, so that the said guides shall make the buckets to pass out and in through their respective apertures. The buckets B B are cast or made of iron, and each bucket is made so as to pass on the center F separately, as seen at Fig. 6, and to pass through the guides E E, as seen at Fig. 2. The center F is made of any desired thickness, is made firm in the slide I', Fig. 3, which slide is made to fit close in K K, as seen at Fig. 7. The slide I' has cogs on one side to match the same on the wheel G, as seen at Fig. 8. This wheel G is made to pass through—that is, the shaft of said wheel—the plate K, as will be seen at *i*, Fig. 3, and has a top on it which, when screwed up, holds the slide I firm in its place. This shaft has a drum M, Figs. 1 and 2, by the turning of which the center F may be moved eccentrically to or from the main shaft D—that is, from the center of the hollow cylinder or drum A A.

M, Fig. 1, is a drum, which has a shaft to pass through the frame-work C to the upper part thereof with wheel and ratchet, being connected with M at the center of the wheel A A at the bottom or under part by means of a belt, by which the center F is adjusted all the spaces, or so much thereof as will not interfere with the working of the guides E E.

Fig. 2, which is represented by the dotted lines $ff$, are filled up with wood or light castings, made water or air tight for the purpose of displacing the water or air that might pass into the hollow drum or cylinder A A, also for the purpose of buoying up the wheel when placed in water or air. The same letters refer to like parts in the drawings, except the small letters. All the parts being placed in their proper places and the wheel being completed, it is operated in the following manner: The wheel is propelled by the main shaft D. The center F is made adjustable by the means herein described, which is passed or placed eccentrically or moved from the center of the hollow drum or cylinder, as represented at Fig. 2, which will cause the buckets to project through the circumference or rim of the cylinder from $b$ to $b$, Fig. 2, and to draw back into the cylinder from $c$ to $c$, Fig. 2. So the buckets may be made to project any number of inches or feet that may be desired, the wheel being placed to work either vertical or horizontal, and turned by the main shaft D, and the frame-work C being attached or made fast to the vessel or other device, the wheel, when revolved, will cause the buckets to be continually projecting at the same side, or one side only, and receding back into the cylinder on the opposite side, causing thereby a smooth surface to be presented on one side of the wheel which prevents their being any back-water or resistance to the wheel, so the wheel may be worked at any depth in water. Having no back-water to contend with the wheel is worked forward or backward without any alteration or change being made therein. The buckets, being produced as herein described and constructed, will, passing from $b$ to $b$, Figs. 1 and 2, appear to or take hold of the water until they are at their extreme point $g$, when they will appear to or let loose the water until they pass inside the drum or cylinder A A until they come to $b$, where they will commence to project again and so on, keeping up a continuous projection on one side of the wheel only. This wheel may be turned or revolved by applying power to the buckets as they project or succeed each other whenever desired or applied in this manner.

I do not claim to be the original inventor of the propeller or paddle-wheel as herein described; but

I claim—

The arrangement of the buckets or floats B B with the guides E E, with the center F I K and the frame C, arranged in the manner substantially and for the purpose as described.

JOHN MAY.

Witnesses:
CHARLES A. KLINK,
THOMAS BRAFILL.